(12) United States Patent  
Panarese

(10) Patent No.: US 8,037,048 B2
(45) Date of Patent: Oct. 11, 2011

(54) WEB SITE SEARCH AND SELECTION METHOD

(75) Inventor: Marco Panarese, Bergamo (IT)

(73) Assignee: Web Lion S.A.S. di Panarese Marco & Co., Bergamo (IT)

( * ) Notice: Subject to any disclaimer, the term of this patent is extended or adjusted under 35 U.S.C. 154(b) by 779 days.

(21) Appl. No.: 12/069,572

(22) Filed: Feb. 11, 2008

(65) Prior Publication Data

US 2008/0208846 A1 Aug. 28, 2008

(30) Foreign Application Priority Data

Feb. 13, 2007 (IT) .............................. BG2007A0012

(51) Int. Cl.
*G06F 17/30* (2006.01)

(52) U.S. Cl. ........ 707/706; 707/711; 707/723; 707/727; 707/748; 707/749; 707/750; 707/752; 707/753; 707/758

(58) Field of Classification Search .................. 707/706, 707/748, 749, 711, 723, 727, 750, 752, 753, 707/758

See application file for complete search history.

(56) References Cited

U.S. PATENT DOCUMENTS

| | | | | | |
|---|---|---|---|---|---|
| 5,758,146 | A | * | 5/1998 | Schiefer et al. ............... | 707/715 |
| 5,778,353 | A | * | 7/1998 | Schiefer et al. ...................... | 1/1 |
| 6,480,837 | B1 | * | 11/2002 | Dutta ................................... | 1/1 |
| 6,871,202 | B2 | * | 3/2005 | Broder ................................. | 1/1 |
| 7,181,438 | B1 | * | 2/2007 | Szabo ................................. | 1/1 |
| 7,634,476 | B2 | * | 12/2009 | Liu et al. ............................. | 1/1 |
| 7,685,084 | B2 | * | 3/2010 | Sisk et al. ........................ | 706/45 |
| 7,801,896 | B2 | * | 9/2010 | Szabo ........................... | 707/739 |
| 7,844,590 | B1 | * | 11/2010 | Zwicky et al. ................ | 707/706 |
| 2002/0129014 | A1 | * | 9/2002 | Kim et al. .......................... | 707/5 |
| 2003/0204502 | A1 | * | 10/2003 | Tomlin et al. ..................... | 707/5 |
| 2005/0060297 | A1 | * | 3/2005 | Najork .............................. | 707/3 |
| 2005/0071465 | A1 | * | 3/2005 | Zeng et al. ..................... | 709/224 |
| 2005/0256860 | A1 | * | 11/2005 | Eiron et al. ....................... | 707/4 |
| 2006/0004809 | A1 | * | 1/2006 | Zhang et al. .................. | 707/101 |
| 2006/0041553 | A1 | * | 2/2006 | Paczkowski et al. ............. | 707/7 |
| 2006/0064411 | A1 | * | 3/2006 | Gross et al. ........................ | 707/3 |
| 2006/0074910 | A1 | * | 4/2006 | Yun et al. .......................... | 707/7 |
| 2006/0235841 | A1 | * | 10/2006 | Betz et al. ......................... | 707/5 |
| 2008/0027936 | A1 | * | 1/2008 | Liu et al. ........................... | 707/7 |
| 2008/0109399 | A1 | * | 5/2008 | Liao et al. ......................... | 707/2 |
| 2010/0082590 | A1 | * | 4/2010 | Nye ............................. | 707/706 |
| 2010/0198773 | A1 | * | 8/2010 | Wallisch ........................ | 706/54 |
| 2010/0223151 | A1 | * | 9/2010 | Kon et al. ....................... | 705/26 |
| 2011/0016106 | A1 | * | 1/2011 | Xia ............................... | 707/706 |
| 2011/0125727 | A1 | * | 5/2011 | Zou et al. ...................... | 707/711 |

OTHER PUBLICATIONS

Martin Hagstrom "Pagerank question"; Oct. 8, 2004; Internet Search Engines; XP002485186.
Roy Schestowitz; Bigger site, lower pagerank; Oct. 12, 2005; Internet Search Engine; XP002485187.

(Continued)

*Primary Examiner* — Thanh-Ha Dang
(74) *Attorney, Agent, or Firm* — Ladas & Parry LLP

(57) ABSTRACT

According to the web site search and selection method, in response to a search query a relevance score is assigned to each page of the web sites addressed by the search engine. Then, for each web site addressed by the search engine, the relevance scores of the individual pages are added together, after weighting them by a correction factor indicative at least of the number of pages of the site itself. In this manner, in response to the search query an overall relevance value for the sites addressed by the search engine is obtained.

9 Claims, 3 Drawing Sheets

OTHER PUBLICATIONS

Wenpu Xing, et al; "Weighted PageRank algorithm"; *Communication Network and Services Research* (2004) pp. 305-314; XP010732745.

P Berkhin; "A Survey on Pagerank Computing"; *Internet Mathematics*; (2005) vol. 2, No. 1; pp. 7-120; XP008059433.

* cited by examiner

WEB SITE SEARCH AND SELECTION METHOD

CROSS REFERENCE TO RELATED APPLICATIONS

Not applicable
Statement Regarding Federally Sponsored Research or Development
Not applicable
Names of Parties to a Joint Research Agreement
Not applicable
Information on a compact Disc
Not applicable

1. Field of the Invention

The present invention relates to a web site search and selection method.

2. Background Art

Search engines represent a valid instrument for navigating the world wide web of hypertextual and hypermedial documents forming so-call web sites.

Search engines have become fundamental in that the number of web sites present on the internet has reached levels unthinkable up to a short time ago; as the directory concept does not exist for web sites, finding a site containing the required information would be impossible without search engines.

Search engines currently enable individual pages to be found: the user requests pages containing determined words; the search engine replies with a list of pages containing those words or, more generally, pages pertinent to those words.

However, as currently available search engines are very powerful and sophisticated, difficulties are still encountered in making searches.

In particular, the search results provide a very large number of documents, very often redundant, it often happening that they are not relevant to the words indicated by the user.

For example, if the Yahoo® search engine is asked to search for documents relevant to the words "miserable liar", the first result is the biography of the President of the United States of America George W. Bush, which certainly does not contain the two words; the same happened up to a few months ago with the Google ® search engine.

Search engines are currently built by implementing three basic technologies:

1) evaluation of the relevance index of a page relative to the words used for the search;
2) evaluation of the page rank which measures the importance of the page independently of its content;
3) the trust rank of a page.

1) The Relevance Index:

Calculation of the relevance index lies at the basis of all search engines, its purpose being to evaluate the relevance of a page relative to the words sought.

The basic idea is the following: a page can be represented as an n-dimension vector, where each dimension corresponds to a word; if that word is not present in the page, the value of the corresponding coordinate in the vector is 0, otherwise the value describes the importance of that word in the page (for example, 1 if the word appears in the standard text, 3 if it appears in the title, etc.).

At this point if the user wishes to seek m words with a search query, this can be represented as an n-dimension vector, where the coordinates corresponding to the words sought have the value 1, while the others have the value 0.

If visualized in n-dimension space, the two vectors have one end in the origin of the axes, and the other corresponding to the coordinates of the n dimensions. Seeing that the more a page is relevant to the search query the more the two vectors are close, the relevance index is the cosine of the angle between the two vectors multiplied by a value which indicates the relevance of the words sought in the page; for example, if the length of the vector representing the page is indicated by l and the angle between the two vectors by $\alpha$, the relevance index $r_i$ can be obtained from the formula:

$$r_i = k * l * \cos \alpha$$

where k is a correction factor specific for the implementations.

The most evolved search engines consider not only the words present on the page, but also the words which label the references to that same page.

This criterion lies at the basis of the fact that the search engine produces as the initial result of the "miserable liar" search the biography of George W. Bush: many bogus references to this page contain the two words in question.

2) The Page Rank

The concept of page rank was introduced for the first time by the Google® search engine and made its fortune, precisely because of this method. Google obtained an effectiveness in the evaluation of results which was unknown to the search engines present at the time.

The idea of the page rank is the following:

a page is important independently of its content; its importance is related to the probability of its being reached by a hypothetical web navigator visiting other pages.

Consequently the rank of a page is directly proportional to the number of references towards it which are present in the other pages, however each reference contributes inversely proportionally to the number of references leaving that same page.

This technology has enabled Google to arrange the search results more effectively, because the page rank is combined with the relevance index: it follows that the more a page containing the sought words is cited by other pages, the more this is relevant.

Normally, the two indices are combined by a simple multiplication.

3) The Trust Rank

In seeking to limit the aforesaid unpleasant effects, the Google® search engine has introduced a new technology, known as "trust rank", which evaluates the degree of reliability of web sites, and consequently of the pages contained in them.

The basic idea is the following: if a page is referenced by a page contained in a reliable site, then it is true that the page is important, otherwise it is not.

A complex propagation mechanism for the degree of reliability has been defined to prevent ruses aimed at obtaining high degrees of reliability without these being merited in reality.

The reliability index is combined with the other two indices to obtain the results display order; the three indices are normally multiplied together.

Google has recently introduced this technology in its search engine; the evident effect is that the search for "miserable liar" no longer gives (in Google) the biography of George W. Bush as the first result.

However, even the most advanced search engines, constructed by combining the relevance index, the page rank and the trust rank, present the considerable drawback of providing very fragmented results in response to a search query.

In particular, those web sites which extensively display on a certain subject are not shown as a unitary assembly of the result, but instead the list provided by the search engine in response to the query shows the individual pages of the site independently of the others.

In addition, if the relevance of the discovered pages is not high (on the basis of the evaluation criteria adopted by the search engine), these sites may not appear in the initial places of the result, so remaining ignored by the user.

BRIEF SUMMARY OF THE INVENTION

The technical aim of the present invention is therefore to provide a web site search and selection method by which the technical drawbacks of the known art are eliminated.

Within the scope of this technical aim, an object of the invention is to provide a web site search engine which, following a search query, is able to provide a response (i.e. a list of web sites) presenting a very limited fragmentation; in other words this list limits or eliminates the large number of pages which, although forming part of the same web site, are indicated as separate documents; hence all the site pages contribute to displaying the overall pertinence of the site to the search query, but do not appear individually and directly in the results list provided by the search engine.

Another object of the invention is to provide a search engine enabling the overall relevance of a site to be displayed, even if this is composed of numerous pages which are individually of little pertinence.

The technical aim, together with these and other objects, are attained according to the present invention by a search engine in accordance with claim 1.

Other characteristics of the present invention are defined in the subsequent claims.

Advantageously, the search engine of the present invention is able to display sites which contain numerous pages but only some of which are effectively relevant to the search made.

BRIEF DESCRIPTION OF THE DRAWINGS

Further characteristics and advantages of the invention will be more apparent from the description of a preferred but non-exclusive embodiment of the search engine according to the invention, illustrated by way of non-limiting example in the accompanying drawings, in which.

DETAILED DESCRIPTION OF THE INVENTION

Figure 1:
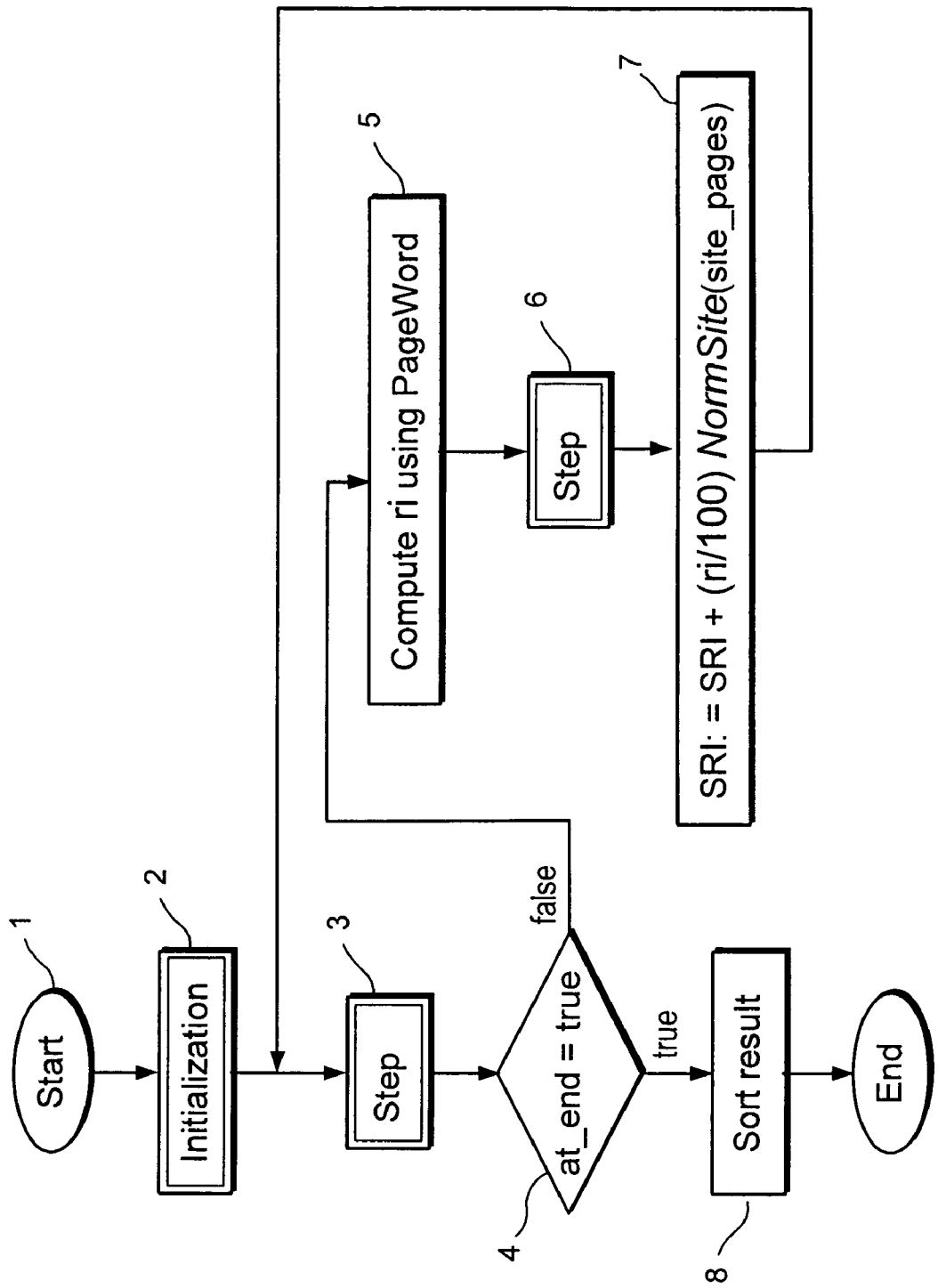
FIG. 1 shows a block diagram indicative of the process of the invention.

With reference to said figures, these show a web site search and selection method.

The basic idea is to calculate a relevance index for the web site, SRI (site relevance index), which aggregates into a single value the relevance of the individual pages, weighted relative to the size of the web site.

In this respect, this index takes account of the relevance of the individual pages, of the quantity of found pages, and of the fact that these pages either form or do not form a significant page rank of the site which contains them.

The SRI index is defined by the following formula:

$$SRI = \Sigma_1 [ri_i/100) + \text{Norm Site(site pages)}]$$

Where:

$ri_i$ indicates the relevance index of the $i^{th}$ page found; and the function NormSite(site pages) is a function of the weight correction relative to the size of the site (actual parameter site pages) which contains them.

In practice, a site is more important the more important are the pages which contain the words sought and the more numerous these are.

Going to the limit, this corresponds to the integral concept. Assuming that we have two sites with the same number of pages (hence the function NormSite(site pages) has the same value), each page is represented by a vertical bar, the base of which has a fixed dimension, while its height is given by its relevance index divided by 100; the SRI index is therefore the sum of the bar areas.

It follows that of the two sites with an equal number of pages, the more relevant for the search query is that with the greater number of pages which not only satisfy the search query but at the same time are more relevant. As the number of site pages varies, the width of the base of the bar representing each page must be varied; this is achieved by the NormSite(site pages) function.

The NormSite(p) function is a hyperbolic function defined, for a certain site, in the following manner:

$$\text{NormSite}(p) = k * [(Yl/p) + \Delta y]$$

Where: p indicates the number of pages in the site; Yl indicates the coordinate on the y-axis at the x-axis point l (normally set at 100); k is a correction factor (normally set at 1 but can be modified); $\Delta y$ indicates the horizontal asymptote above which the hyperbola (normally set at 0) is positioned.

It follows that if the site were to consist of a single page, the NormSite(p) function would be equal to 100, which multiplied by the page relevance index divided by 100, gives exactly the page relevance index.

As the number of site pages increases, SRI is obtained as the sum of the relevance indices of the pages found, weighted relative to the number of pages; being hyperbolic, the function decreases rapidly with increasing number of pages from 1 to 10, to then decrease more gradually as the number of pages increases.

The NormSite(p) function tends asymptotically to 0 (or rather to $\Delta y$) because the probability of finding a large number of pages which satisfy the search query decreases with increasing number of site pages.

Hence, the hyperbolic variation has the advantage of not excessively penalizing very large sites, compared with smaller sites, which however have less probability of containing pages which satisfy the query.

However, if the words sought by the query are present in the actual site title, these recur in a very large number of site pages, with the result that the site will have a very high SRI value, very probably much higher than all other sites.

In practice, the SRI index calculated by the present method enables a site organization to be established, the significance of which is intuitive: a site is relevant to the query if it contains a number of pages relevant to the query inversely proportional (according to a hyperbolic relationship) to the number of pages contained in the site. The algorithm for calculating the SRI index requires index structures stored in rows on a mass memory, which represent an efficient manner for seeking the relevance of words of web sites relative to the words themselves.

The index structures comprise a first file: F_site_pages, and a second file: F_Page_word.

The first file F_site_pages contains, for each site indexed by the search engine, the total number of pages in the site. The file is organized sequentially and contains the pairs (site_id, site_pages) arranged increasingly for the field site_id.

The second file F_Page_word(word) is defined for each word found in at least one page indexed by the search engine; the file is organized as a sequence of triplets (site_id, page_id, relevance) which indicate, for each page, the relevance of this relative to the word (the relevance is a whole number from 1 to 15); the triplets (site_id, page_id, relevance) are arranged increasingly for the fields site_id and page_id.

The algorithm which efficiently evaluates the sites starting from the word search (see FIG. 1) will now be described.

STEP 1: START

A query is fed to the search engine input consisting of a sequence of one or more words.

In response to the query (i.e. as output) the search engine provides (on termination of the process) a result consisting of a sequence of site_id/SRI/site_pages triplets arranged inversely by SRI.

STEP 2: INITIALIZATION

The following settings are applied in this step:
Result=Ø;
Current_site_id:=0
at_end=false
PageWord(n)=initialized at (0, 0, 0); the vector PageWord(n) is defined by a vector of n triplets (site_id, page_id, relevance).

Figure 2:
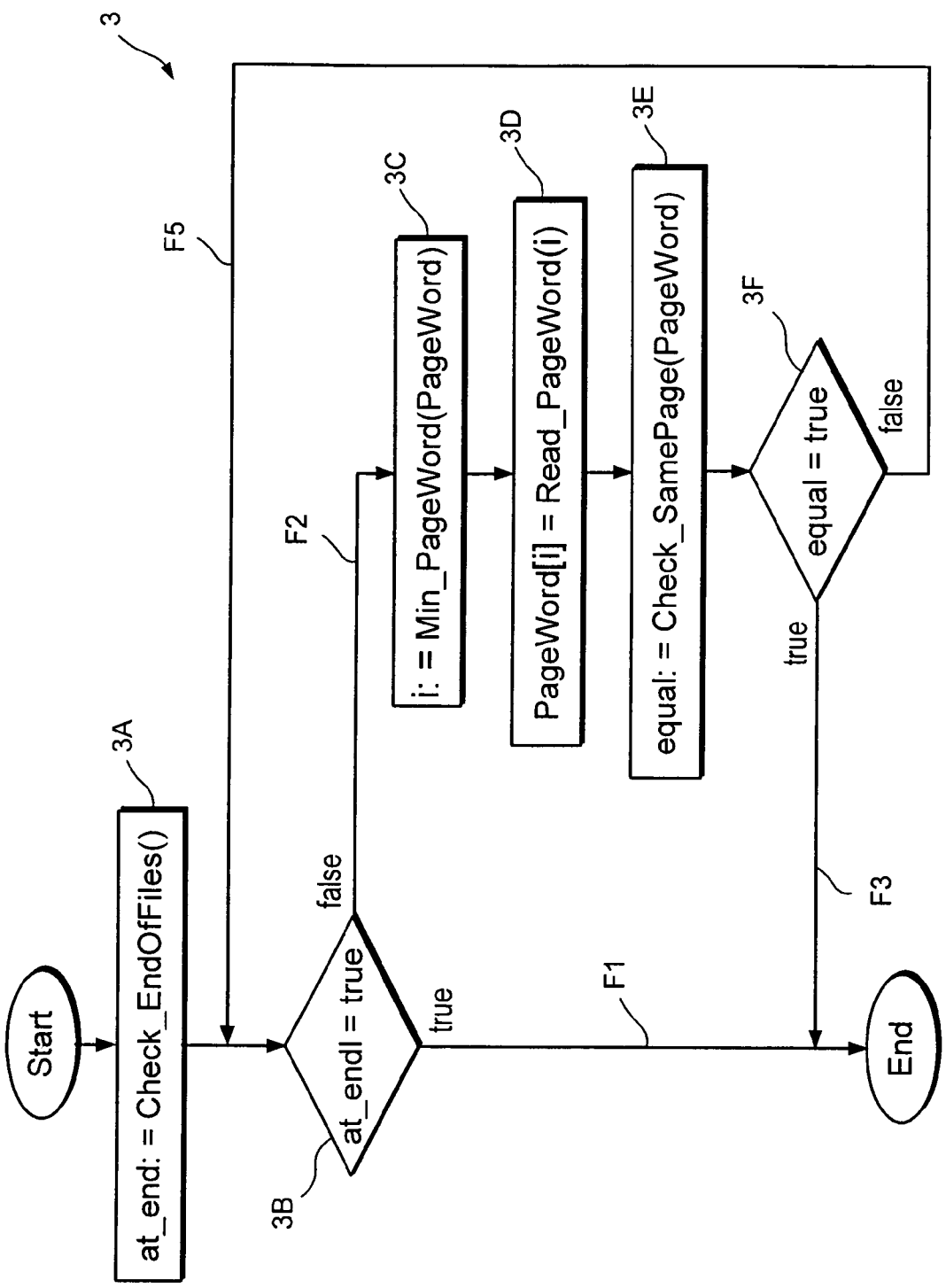
FIGS. 2 and 3 show two block diagrams each indicative of a portion of the overall block diagram of FIG. 1.
Figure 3:
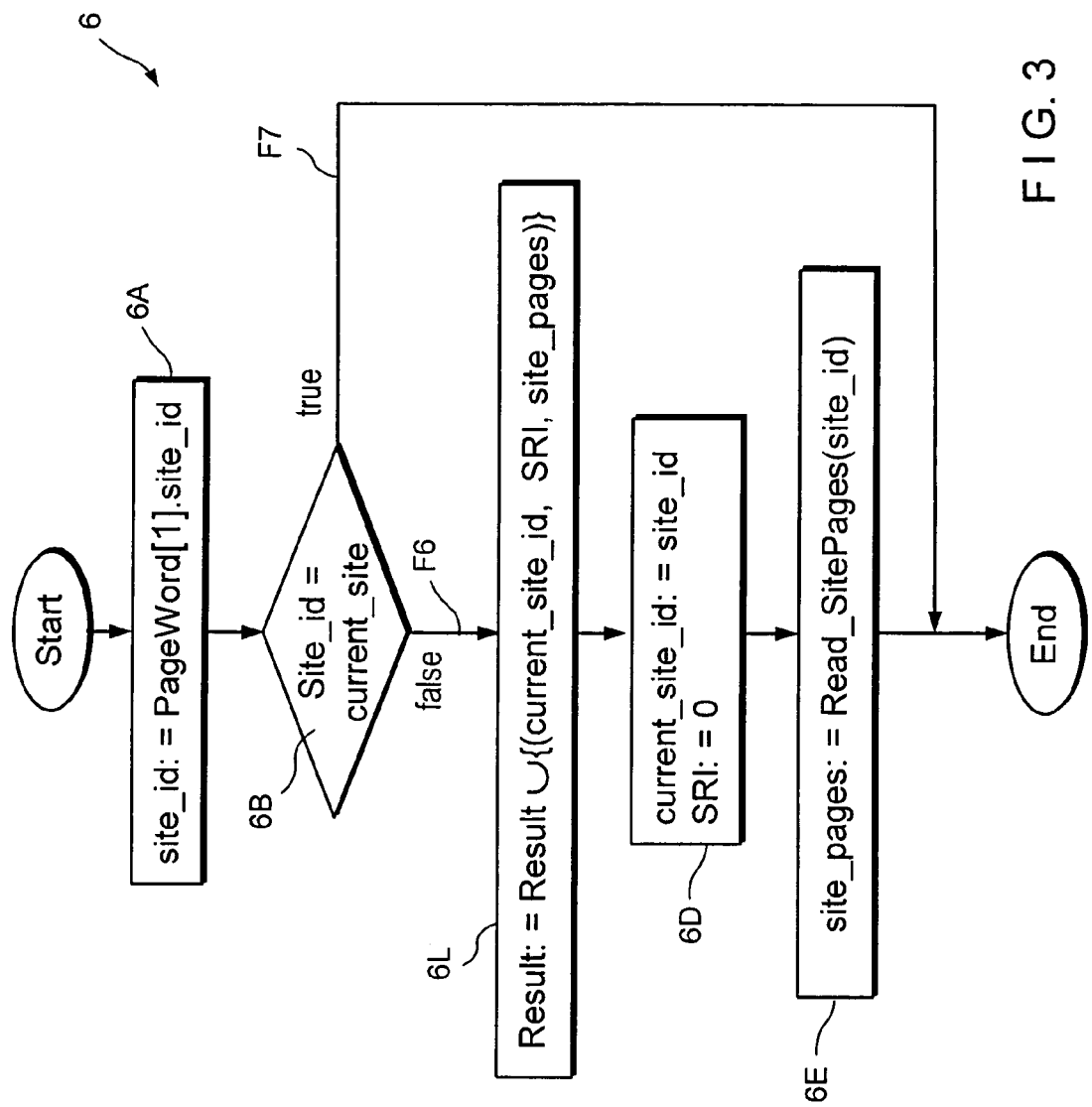

STEP 3 (FIG. 2);

Initially, in steps 3A and 3B a check is made to ascertain if one of the n files F_Page_word($word_i$) has set the variable at_end at true (Check_EndofFiles( )); if affirmative, the execution passes to step 8, this being indicated by the arrow F1 in FIG. 2.

If the variable at_end is still "false" (i.e. this variable has not yet been set to "true", see arrow F2), step 3C chooses the index i corresponding to the smallest file F_Page_Word (i.e. the index i corresponding to the file F_Page_Word defining the smallest page relative to the criterion site_id, page_id), then in step 3D the file F_Page_Word corresponding to the value i chosen in step 3C is extracted.

In step 3E the page extracted in step 3D is compared with the next page, then if the n pages coincide (step 3F) the procedure passes to step 8 (see arrow F3, at_end is set to "false"), otherwise it returns to the commencement of step 3 (arrow F5).

STEP 4

In step 4, if the variable at_end presents the value "true" the process passes to step 8 otherwise, if the variable at_end is "false", it passes to step 5.

STEP 5

Step 5 calculates the relevance index $r_i$ for the page, by combining the relevance values extracted from the n files F_Page_Word(word).

STEP 6 (FIG. 3)

Steps 6A and 6B check whether the site containing the current page is equal to the site considered in the previous step; if negative (arrow F6, step 6C) the old site is inserted into the list of result sites (via site_id) with the found value of the SRI index; then the SRI value is zeroed (step 6D) and the number of pages site_pages of the new site is read from the file F_site_pages (step 6E). The process then passes to step 7.

If in steps 6A and 6B it is found that the site containing the current page is different from the site considered in the previous step, the process passes directly to step 7 (arrow F7).

STEP 7

In step 7 the relevance index $r_i$ normalized using the function NormSite(site_pages) is added to SRI.

The process then returns to step 3.

If in step 3 it is found that the variable at_end is "true", the process passes to step 8.

STEP 8

In step 8 the results list is organized decreasingly relative to the field SRI and is printed on the screen.

In this manner the algorithm is linear relative to the size of the files F_Page_Word($word_i$).

The complexity of the algorithm is given by:

$$O[\Sigma_i \dim(F\_Page\_Word(word_i))] < O[n * \max(F\_Page\_Word(word_i))]$$

where dim(F_Page_Word($word_i$)) indicates the dimension (number of triplets) of the file containing the index of the word. The algorithm is therefore very efficient.

The flow diagrams use the following described functions:

Check_EndOfFiles: this checks whether the end of at least one of the files F_Page_Word($word_i$) has been reached; if this happens, it returns the boolean value "true", otherwise the boolean value "false".

Min_PageWord: this chooses the file (indicated by the index of the word in the query, which ranges from 1 to n), the current read page of which (described by the $i^{th}$ position of the vector PageWord) is smaller than all the others described in the vector PageWord.

Read_PageWord reads the successive pages in the file associated with the index i and extracts the triplet (site_id, page_id, relevance).

Check_SamePage checks whether the n pages described in the vector PageWord coincide; if this is the case it returns the boolean value "true", otherwise it returns the Boolean value "false".

Read_SitePages reads the number of pages which make up the site specified by the file F_site_pages.

IMPLEMENTATION OF THE SEARCH ENGINE

For implementing the system of indices, the search engine is hosted by a redundant server system, the operating process being given by the parallelism ensured by the dual core processors which enable several processes to be implemented simultaneously and ensure a high level of stability and efficiency, to considerably reduce the risk of denial of service.

A repeated database system is also provided, which besides improving performance has the further advantage of averting the risk of data loss.

To improve system maintenance and prevent risk of attack, a virtual server platform has been used: in practice the actual machine hosts different virtual servers which operate on the resources made available by the real machine. In this manner, possible attacks may block the virtual server, but not the physical server, which can continue to operate and, in the case of failure of the virtual server, can automatically restart it.

The software platform on which the system is based is the following.

The operating system is Linux in the Fedora distribution. The virtualization software is Xen, developed by the University of Cambridge. The programming languages are: 1) Java in the 1.4.2 Enterprise Edition version for web implementation, 2) C++ for implementation of the evaluation algorithm based on GWSEM technology, 3) Perl for the site crawler The web-server is Jakarta Tomcat 5.5.7. The DBMS used is PostgreSQL version 8.

All these solutions are characterised by their lightness in execution: as they do not require considerable computation resources they enable better performing systems to be obtained, hence excellent response times.

The indices of the individual words are contained in the file system. To adequately handle the large number of files (some hundreds of thousands when fully operating) a 5-level structure has been used: given a word "abcdexxx", the corresponding index is contained in the file "a/b/c/d/e", the indices of shorter words being contained in the files of intermediate level corresponding to the word length.

The method of the present invention is implemented via software.

The invention claimed is:

1. A web site search and selection method comprising:
responding to a search query by assigning a relevance score to each page of web sites containing a number of pages addressed by a search engine, wherein, for each web site addressed by the search engine, said method comprises the following operations:
adding together relevance scores of individual pages identified by the search engine,
weighting said relevance scores by a correction factor indicative at least of the number of pages of the web site, and
obtaining, in response to the search query, an overall web site relevance index for the web sites addressed by the search engine wherein said web site relevance index (SRI) is determined by a formula:

$$SRI = \Sum_I [rl_i 100 + NormSite (web\ site\ pages)]$$

where $rl_i$ indicates the relevance score of the $i^{th}$ page found and NormSite (web site pages) is a hyperbolic correction factor calculated by NormSite (web site pages)=$k*[(YI/p)+\Delta y]$,
where:
p indicates the number of pages in the web site;
YI indicates a coordinate on the y-axis at the x-axis point I in a plot of relevance (y-axis) against page number (x-axis);
k is a correction factor; and
$\Delta y$ indicates a horizontal asymptote above which a hyperbola is positioned;
at least one of said operations being implemented on a computer having a processor and a memory coupled to said processor.

2. The web site search and selection method as claimed in claim 1, wherein in the hyperbolic correction factor NormSite (p)=$k [(YI/p) +\Delta y]$, k=1; YI=100; and $\Delta y$=0.

3. The web site search and selection method as claimed in claim 2, characterized in that the search engine uses a first file F_site_pages containing for each web site indexed by the search engine a total number of web site pages, the search engine also generating a second file F_Page_word for each word found in at least one page indexed by the search engine.

4. The web site search and selection method as claimed in claim 3, characterized in that the first file F_site_pages is organized sequentially and contains pairs of "site id, site pages" arranged relative to the field site_id.

5. The web site search and selection method as claimed in claim 1, wherein the search engine uses a first file F_site_pages containing for each web site indexed by the search engine a total number of web site pages, the search engine also generating a second file F_Page_word for each word found in at least one page indexed by the search engine, each of said web sites having a field site_id.

6. The web site search and selection method as claimed in claim 5, wherein the first file F_site_pages is organized sequentially and contains pairs of "site id, site pages" arranged relative to the field site_id.

7. The web site search and selection method as claimed in claim 5, characterized in that the second file F_Page_word is organized as a sequence of triplets "site_id, page_id, relevance" arranged relative to the fields site_id and page_id, said triplets indicating, for each page, a relevance of the page relative to a word sought.

8. The web site search and selection method as claimed in claim 1, characterized in that in response to the search query, the search engine provides a list of web sites arranged in overall order of relevance.

9. The web site search and selection method as claimed in claim 1, characterized by being implemented via software.

* * * * *